(12) United States Patent
Li

(10) Patent No.: US 6,909,806 B2
(45) Date of Patent: Jun. 21, 2005

(54) IMAGE BACKGROUND REPLACEMENT METHOD

(75) Inventor: Baoxin Li, Camas, WA (US)

(73) Assignee: Sharp Laboratories of America, Inc., Camas, WA (US)

(*) Notice: Subject to any disclaimer, the term of this patent is extended or adjusted under 35 U.S.C. 154(b) by 0 days.

(21) Appl. No.: 10/970,096

(22) Filed: Oct. 20, 2004

(65) Prior Publication Data

US 2005/0053278 A1 Mar. 10, 2005

Related U.S. Application Data

(62) Division of application No. 09/872,205, filed on May 31, 2001.

(51) Int. Cl.[7] .............................. G06K 9/34; G06K 9/62
(52) U.S. Cl. ........................ 382/173; 382/224; 382/228
(58) Field of Search ................................ 382/162, 164, 382/165, 172, 173, 219, 220, 221, 224, 228, 236, 260, 272, 308; 345/474, 634; 348/135, 571, 700

(56) References Cited

U.S. PATENT DOCUMENTS

| | | | | |
|---|---|---|---|---|
| 5,764,803 A | * | 6/1998 | Jacquin et al. | 382/236 |
| 5,781,198 A | * | 7/1998 | Korn | 345/634 |
| 5,852,673 A | * | 12/1998 | Young | 382/164 |
| 6,249,613 B1 | * | 6/2001 | Crinon et al. | 382/236 |
| 6,301,385 B1 | * | 10/2001 | Chen et al. | 382/173 |
| 6,697,072 B2 | * | 2/2004 | Russell et al. | 345/474 |
| 6,707,939 B1 | * | 3/2004 | Weinholz et al. | 382/164 |
| 6,707,940 B1 | * | 3/2004 | Qian | 382/173 |
| 6,819,796 B2 | * | 11/2004 | Hong et al. | 382/173 |

* cited by examiner

Primary Examiner—Andrew W. Johns
Assistant Examiner—Amir Alavi
(74) Attorney, Agent, or Firm—Chernoff, Vilhauer, McClung & Stenzel, LLP

(57) ABSTRACT

An image's pixels are initially segmented into pixels of the image foreground and background by comparing the pixels of the image to updated models of background reference pixels. Pixel structures are identified in the image. The probability that a pixel is in the background or foreground is refined by considering the initial segmentation of the pixel's neighbors and the pixel's membership in a pixel structure. If a pixel is identified as a background pixel it is replaced by a pixel of a new background.

33 Claims, 4 Drawing Sheets

IMAGE BACKGROUND REPLACEMENT METHOD

CROSS-REFERENCE TO RELATED APPLICATIONS

This application is a division of U.S. application Ser. No. 09/872,205, filed May 31, 2001.

BACKGROUND OF THE INVENTION

The present invention relates to image processing, and more particularly, to an image processing method facilitating replacement of the background of an image with a new background.

Background replacement is an image processing method commonly used in professional production of images, video, and motion pictures. Background replacement generally comprises the steps of segmenting the elements of the foreground and background of an image followed by substituting pixels of a new background for the pixels of the image's original background. Blue screening or chroma keying is a background replacement process commonly used by professional movie, video, and, televison studios. In the blue screening process, the foreground elements of an image are captured in front of a screen of a uniform color, usually blue. During editing, the blue pixels are identified as background pixels and replaced with spatially corresponding pixels from a replacement background. While blue screening or chroma key replacement is commonly used in motion picture and television production, the process is not well suited to amateur or non-studio image and video production. For the technique to work properly, the pixels of the background screen must be a uniform color so that they will be correctly identified. Therefore, the foreground elements of the image must be filmed in a studio under carefully controlled lighting conditions. In addition, the color of the background screen must be significantly different from the color of pixels of the foreground elements of the image. Any "blue" pixels of a foreground element will be identified as background and replaced.

To avoid the cost and limitations of the blue screening process, techniques have been developed to perform background replacement without the necessity of a blue screen. Generally, these processes utilize either a global-based or a pixel-based method to segment the foreground and background elements of the image. A global-based method typically classifies image elements as foreground or background on the basis of models of typical foreground or background elements. However, accurate classification of foreground and background elements with these methods is limited by the difficulty of modeling complex objects in the feature space (typically, a color space) in which the segmentation process operates.

Pixel-based methods classify each pixel of the image as either a background or foreground pixel by comparing the pixel to its spatially corresponding counterpart in a separately recorded image that includes only the background. For example, Korn, U.S. Pat. No. 5,781,198, METHOD AND APPARATUS FOR REPLACING A BACKGROUND PORTION OF AN IMAGE, discloses a pixel-based background replacement technique. Two images of a scene are captured. A first or input image includes both the foreground elements and the background. A second image includes only the background. The pixels of the images are sampled and stored. A copy of both images is low-pass filtered to create blurred versions of the images. Spatially corresponding pixels from the two filtered images are compared. If pixels of a spatially corresponding pair are similar, the pixel from the input image is assumed to be from the background. However, if the pixels of a pair are sufficiently different, the pixel from the input image is classified as a foreground pixel. A binary image mask is created to indicate the membership of each pixel of the input image in either the pixels of the foreground or the background. Utilizing the image mask, spatially corresponding pixels of a new background image are substituted for the pixels of the original background of the input image.

While pixel-based techniques generally provide more accurate image segmentation than global replacement techniques, accurate pixel-based segmentation requires consistency between the background pixels of the input image and the pixels of the background reference image. If a pair of spatially corresponding pixels from the two images varies significantly, the pixel at that location will be classified as a foreground pixel. However, the values of pixels of sequential images of the same scene can vary substantially due to extraneous influences. For example, noise originating in the charge-coupled device (CCD) of the camera can produce random variations in the values of the spatially corresponding pixels of two images of a sequence. In highly textured areas of an image, such as an area capturing an image of the leaves of a plant, the values of adjacent pixels can vary substantially. Even slight movement of the camera or a minor change in surface lighting can cause significant differences in the values of spatially corresponding pixels of textured areas of sequential images. In addition, small object motion, such as movement of the leaves of a plant, will substantially reduce the accuracy of pixel-based image segmentation. As a result, pixel-based background replacement for video is generally limited to video sequences of indoor scenes having a stationary, low texture background that is captured with high quality video equipment.

What is desired, therefore, is an image background replacement system that provides accurate image segmentation, can be produced with readily available equipment, and is tolerant of noise and motion of small objects in the image background.

DETAILED DESCRIPTION OF THE INVENTION

Image background replacement may be used in a number applications. By way of example, a video conference may be more acceptable or persuasive to certain participants if the background resulting from filming in a studio, conference room, or exterior location is replaced with a new background. Likewise, a video artist may wish to replace the background of a video sequence with animation or another special effect. However, for many of these applications the costs of professional background replacement editing and video acquisition with expensive professional grade equipment under carefully controlled conditions are not justifiable. A system facilitating convenient image and video background replacement with generally available video capture and editing equipment is highly desired.

Figure 1:
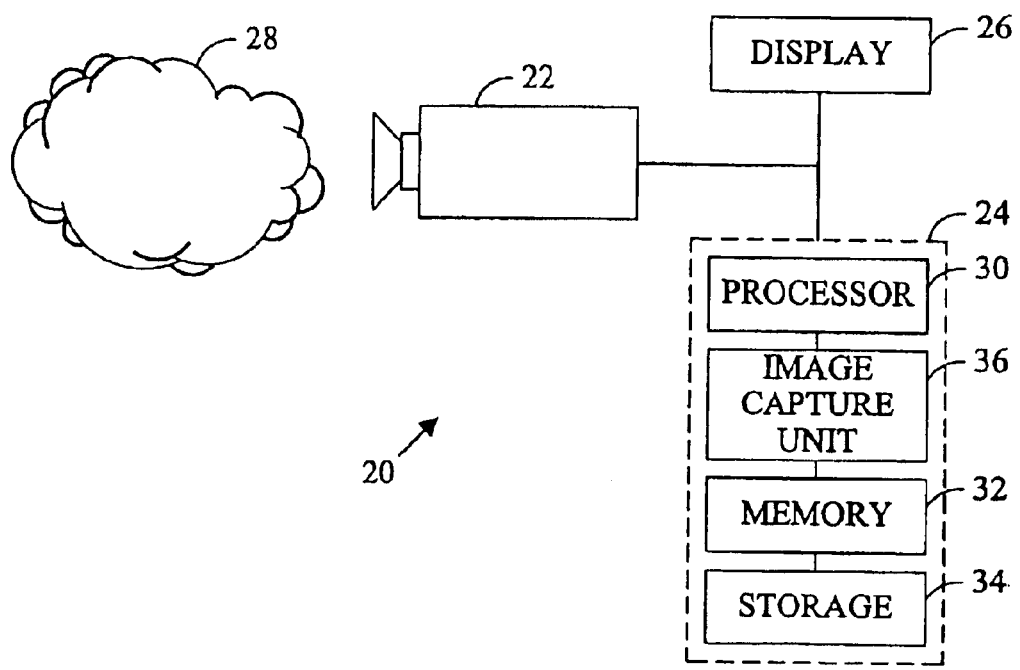
FIG. 1 is a block diagram of an exemplary image processing system.
Figure 2A:
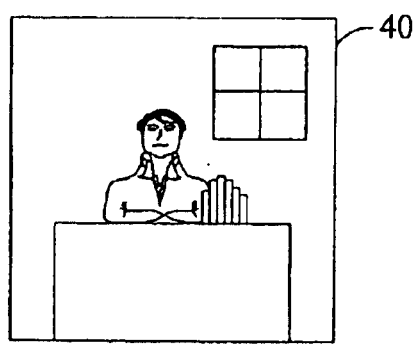
FIG. 2A is an illustration of an input image to a background replacement system.
Figure 2B:
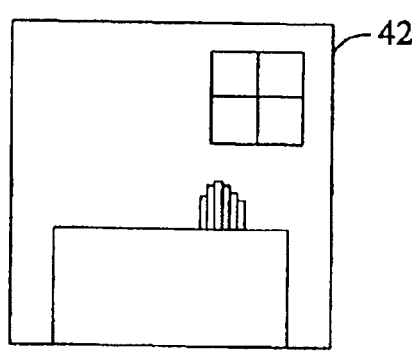
FIG. 2B is an illustration of a background reference image for the scene in the exemplary input image of FIG. 2A.
Figure 2C:
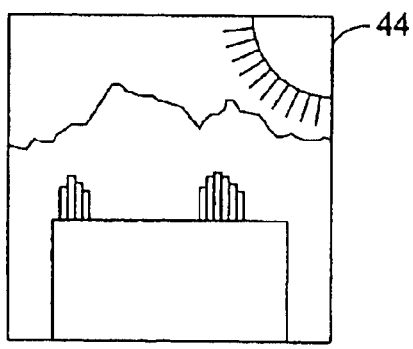
FIG. 2C is an illustration of a new background to be inserted into the input image of FIG. 2A.
Figure 2D:
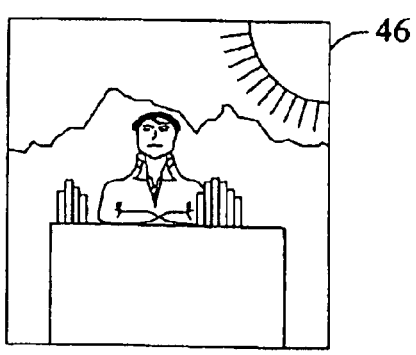
FIG. 2D is an illustration of an image output by a background replacement system combining the foreground of the input image of FIG. 2A and the new background of FIG. 2C.

Referring to FIG. 1, an exemplary digital image processing system 20 includes a camera or other imaging device 22, a computer system 24 for storing and editing images, and an output device 26 to display or generate hard copies of the images. The computer system 24 may be a personal computer or a dedicated image processing computer system. On the other hand, the computer 24 and the output device 26 may be part of the imaging device 22. Typically, the computer system 24 includes a processing system 30, a memory 32, and a storage device 34 such as a disk drive. The storage device 34 provides permanent storage for images and computer programs used in image capture and editing. The memory 32 provides temporary data storage including storage of images during segmentation of the foreground and background and during background substitution. The processing system 30 performs the data manipulation required to segment the foreground and background of an image and insert of the new background into the image.

The imaging device 22 may be any type of camera or device capable of capturing images of a scene 28. To facilitate editing and processing of images captured by the imaging device 22, the imaging device 22 or the computer system 24 typically includes an image capture unit 36 that converts the images captured by the imaging device 22 into data that can be read and manipulated by the processing system 30. In the image capture unit 36, the image of the scene 28 obtained from the imaging device 22 is sampled and digitized to produce an array of data representing an array of picture elements or pixels making up the image.

The background replacement system of the present invention is generally a pixel-based system. Referring to FIGS. 2A–2D, image segmentation is performed by comparing pixels from an input image 40 containing both the foreground and background of a scene with the spatially corresponding pixels of a background reference image 42 that contains only the background of the scene. Following segmentation, the pixels of the new background 46 are substituted for spatially corresponding background pixels of the input image 40 to produce an output image 48 containing the foreground of the input image 40 and the new background.

Figure 3:
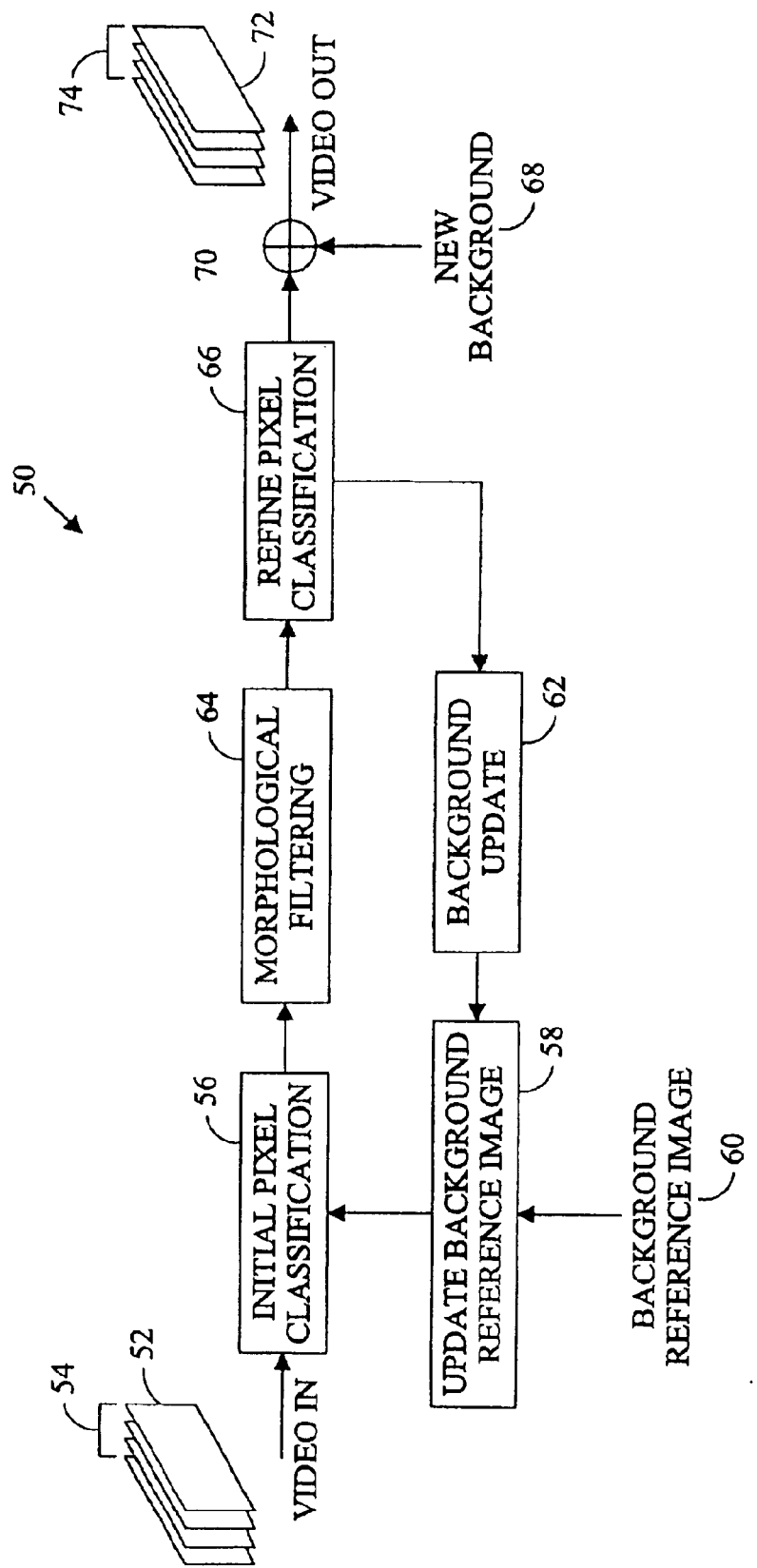
FIG. 3 is a block diagram of a background replacement system of the present invention.

Referring to FIG. 3, the initial segmentation of an input image 52 is accomplished by classifying each pixel on the basis of the probability that it is either a background or foreground pixel. The input pixel is compared to a model of a background reference pixel obtained from an updated background reference image 58. If the input pixel is substantially the same as the corresponding background reference pixel, it is probably a background pixel. If the two pixels differ substantially, the input pixel is probably a foreground pixel.

While the pixel-based segmentation process 56 produces good results, noise in the image capturing element of the camera, camera movement, and lighting changes can cause transient variations in values of pixels resulting in misclassification of pixels. Transient variations are a particular problem in highly textured regions of an image where spatially neighboring pixels have widely disparate values. In addition, pixels can be misclassified because a pixel located at particular spatial coordinates in an image may change during the time interval captured by the plurality of images comprising a video sequence. In the background replacement system 50, the background reference pixels are modeled to reduce the impact of any transient variation in the pixel. Further, the models of the background reference pixels, originally obtained from a background reference image 60 are updated 62 as the video sequence progresses. Updating the pixels of the background reference image 58 reduces the likelihood of misclassification resulting from longer term temporal variation in the value of the pixel.

Movement of elements in the image background also produces variations in pixel values between sequential images of the video sequence resulting in misclassification of pixels. Generally, background replacement is limited to indoor scenes to control the texture of the background and to eliminate movement of small elements in the background (such as wind generated movement of foliage). In the image replacement system of the present invention, the initial pixel classification 56 is followed by a refinement process 66. The image is filtered 64 to identify elements or pixel structures included in the image. In the refined pixel classification 66, the final or refined probability that an input pixel is a background or foreground pixel is based on the input pixel's membership in a pixel structure and a probability that a neighboring pixel is either a background or foreground pixel. If the input pixel is identified as a background pixel, a spatially corresponding pixel from the new background 68 is substituted 70 for the input pixel to create the output image 72. If the input image 52 is a frame of a video sequence 54 (indicated by a bracket), the images are processed sequentially to produce an output sequence 74 (indicated by a bracket) of frames 72 containing images with the new background.

Figure 4:
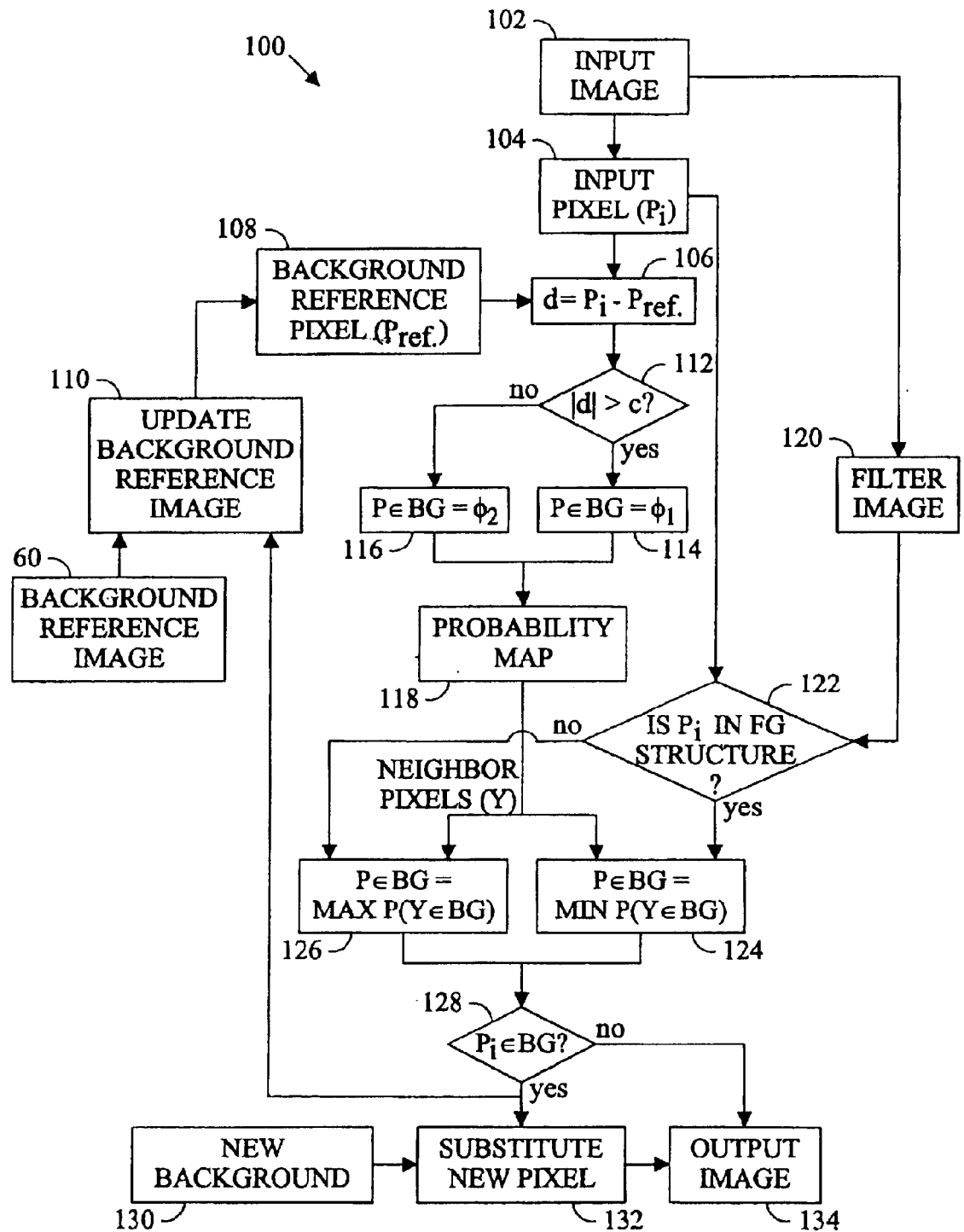
FIG. 4 is a flow diagram of a background replacement method of the present invention.

Referring to FIG. 4, in the background replacement method 100 of the present invention, images (which may be frames of a video sequence) are input 102 to the background replacement system 50. The pixels of the input image 102 are input sequentially 104. Typically, the digitized input pixels of an input frame 52 are measured or represented by the values of their red, green, and blue (RGB) chromatic components. To facilitate the background replacement process, the pixels of the input and background reference images are conveniently represented by a pair of chromatic values r and g where:

$$r = \frac{R}{R+G+B}$$

$$g = \frac{G}{R+G+B}$$

where: R=intensity of the red component
G=intensity of the green component
B=intensity of the blue component To classify pixels in gray regions of an image, the intensity of a pixel can be computed from the values of the red, green, and blue components. However, to reduce the computational requirements, a pixel summation (s) can be substituted for the intensity where:

$$s=R+G+B$$

The initial classification of an input pixel as more probably a foreground or a background pixel is performed by comparing the input pixel to a model of the spatially corresponding background reference pixel 108 obtained from an updated background reference image 110. To reduce the effect of transient variation in a background reference pixel due to noise, movement, or lighting changes, the pixels of the background are modeled by their mean value which is periodically updated. Initially, the model of the background reference pixel is assigned the value of the spatially corresponding pixel in a background reference image 60. The background reference image 60 is an image of the scene 28 containing only the background. When the frames of a video sequence 54 are segmented, the values of input pixels classified as background pixels are periodically used to update the mean and standard deviation of the corresponding model background reference pixel 108 to create the updated background reference image 110. If the mean and standard deviation of a pixel are updated after N frames, the revised mean and standard deviation are determined by:

$$m_x^{(new)} = \alpha m_x^{(prior)} + (1-\alpha) m_x^{(current)}$$

$$\sigma_x^{(new)} = \alpha \sigma_x^{(prior)} + (1-\alpha) \sigma_x^{(current)}$$

where: $m_x$=mean value of the pixel x $\sigma_x$=standard deviation of the pixel x The initial classification of the input pixel 104 is determined by comparing the difference between the input pixel and the background reference pixel model 106 to a threshold difference 112. Each input pixel of the input frame is compared to the mean ($m_x$) of its spatially corresponding counterpart in the updated background reference image 58 and a difference vector (d) is obtained:

$$d = (d_r, d_g, d_s)$$

where: $d_r$, $d_g$, and $d_s$ are the differences between the r, g, and s values for the input pixel and the corresponding background reference pixel from the updated background reference frame 106. Initially, the probability that the input pixel is a pixel of the background is determined by the probability relationship:

$$P(x \in BG) = \begin{cases} \varphi_1(dr, dg, ds) & \text{if } |d| > c \\ \varphi_2(dr, dg, ds) & \text{otherwise} \end{cases}$$

where: P(x∈BG)=the probability that the pixel (x) is a background pixel d=a difference vector=(dr, dg, ds)

c=a threshold vector $\phi_1$ (dr, dg, ds)=first probability function $\phi_2$ (dr, dg, ds)=second probability function (The probability that the input pixel is a foreground pixel equals 1−P(x∈BG).) If the absolute value of the difference (d) 112 between the input pixel and the spatially corresponding background reference pixel exceeds the threshold (c) the probability that the pixel is a background pixel is determined by a first probability function (($\phi_1$) of the difference vector ($d_r$, $d_g$, or $d_s$) 114. If the absolute value of the difference 112 is less than the threshold value, the probability that the pixel is a background pixel is determined by a second probability function ($\phi_2$) of the difference vector ($d_r$, $d_g$, or $d_s$) 116. The result is a probability map 118 expressing the probability that each of the pixels of the input image 102 is a pixel from the background of the image. The absolute value of the difference vector (|d|) exceeds the value of the threshold (c) if any component of the difference vector ($d_r$, $d_g$, or $d_s$) is larger than its counterpart in c ($c_r$, $c_g$, or $c_s$). The value of the threshold vector c can be established by experimentation, but a convenient value is two standard deviations (c=2$\sigma_x$).

The accuracy of the initial segmentation can be adequate if the background pixels are relatively homogeneous and the pixel values are relatively static. However, a natural scene (especially in an outdoor setting) often contains areas that are highly textured and objects that are subject to small motion. For example, foliage produces a highly textured image that is subject to small object motion as the wind moves the leaves. Highly textured areas can produce spatial and temporal aliasing, especially when captured with a camera with noisier components. Since the value of a pixel can change radically, pixel by pixel classification, as applied in the initial segmentation 56, can misclassify a pixel. To improve the accuracy of the segmentation, the probability that the pixel is correctly classified is refined by considering the classification of its neighbors and the input pixel's membership in a pixel structure included in the image.

Morphological filtering 120 is applied to the initial segmentation result to identify large, connected structures of pixels in the input image. These large connected regions of the image are assumed to be objects in the foreground. The morphological filtering fuses the local detection probability from the initial segmentation with global shape information. The location of the input pixel 104 is compared to the locations of the pixels included in the foreground structures 122 to determine if the input pixel is a member of a structure.

Figure 5:
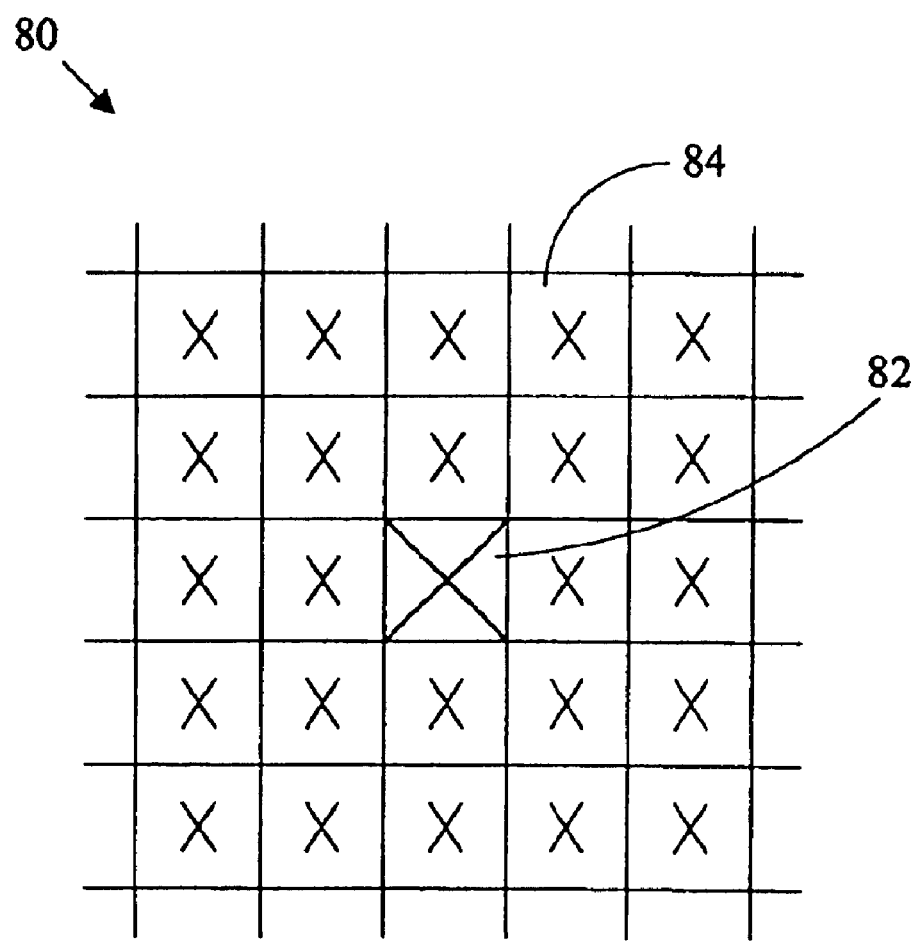
FIG. 5 is a schematic representation of an exemplary pixel neighborhood.

In the final segmentation of the image, the classification of the input pixel is refined by assigning to the pixel the probability that one of its neighbors is a background or foreground pixel. If the input pixel is a member of a foreground structure 122 the refined probability that the input pixel is a background pixel is determined by a first probability relationship 124 and if it is not a member of a foreground structure its refined or revised probability is determined by a second probability relationship 126. The first and second probability relationships assign to the input pixel the probability that one of its neighbors is a background (or foreground) pixel. A five pixel by five pixel neighborhood 80 of the input pixel 82 as illustrated in FIG. 5 has been found to produce satisfactory results, although neighborhoods of other sizes and shapes can be utilized.

For an input pixel 82 located in an identified foreground structure 122, the minimum of probability that one of its neighbors is a background pixel is assigned as final or revised probability that the input pixel is a background pixel by the first probability relationship 124. Formally, the probability that the pixel is a background pixel is expressed, as follows:

$$P(x \in BG) = \min_{y_i \in N(x)} P(y \in BG)$$

where: P (x∈BG)=the probability that the pixel (x) is a background (BG) pixel min P(y∈BG)=the minimum of the probabilities that one of the neighboring pixels (y) is a background pixel.

If the pixel is located within an identified foreground structure and the probability that one of its neighbors is background pixel is minimized, the likelihood that the pixel is a foreground pixel (not a background pixel) is maximized.

On the other hand, if the pixel is not included in a foreground structure as identified by the filtering 120, the probability that the pixel is a background pixel is determined by the probability relationship 126:

$$P(x \in BG) = \max_{y_1 \in N(x)} P(y \in BG)$$

where: max $P(y \in BG)$=the maximum of the probabilities that one the neighboring
pixels (y) is a background pixel.

If the input pixel 82 is not located within an identified foreground structure, the likelihood that it is a background pixel is equal to the maximum probability that one of its neighbors is a background pixel.

The input pixel's membership in the background (or foreground) is determined from the final or revised probability 128. If the input pixel is a background pixel 128, its value is used to update the background reference pixel model in the background reference image 110 according to an updating schedule. Pixels of the new background 130 are substituted 132 for the spatially corresponding input pixels that have been classified as background pixel. Pixels of the new background 130 and input pixels that are determined to be foreground pixels 128 are combined to produce the output image 134. The segmentation and background replacement is performed sequentially for the sequence of input images comprising a video sequence to produce an output sequence of frames with the new background.

Pixel-based image segmentation produces accurate segmentation but pixels can be misclassified as a result of transient or temporal variations in pixel values during a video sequence. The likelihood that a pixel will be misclassified is reduced by comparing input image pixels to an updated model of the background reference pixels of the background reference image. Refining a pixel's classification on the basis of the classification of the pixel's neighbors and the pixel's membership in a structure identified by morphological filtering fuses the pixel-based classification of the initial segmentation with a global analysis to further reduce misclassification caused by the motion of small objects in the background of the scene.

The detailed description, above, sets forth numerous specific details to provide a thorough understanding of the present invention. However, those skilled in the art will appreciate that the present invention may be practiced without these specific details. In other instances, well-known methods, procedures, components, and circuitry have not been described in detail to avoid obscuring the present invention.

All the references cited herein are incorporated by reference.

The terms and expressions that have been employed in the foregoing specification are used as terms of description and not of limitation, and there is no intention, in the use of such terms and expressions, of excluding equivalents of the features shown and described or portions thereof, it being recognized that the scope of the invention is defined and limited only by the claims that follow.

The invention claimed is:

1. A method of segmenting an image, said method comprising the steps of:
    (a) capturing said image comprising a plurality of input pixels representing a background and a foreground of a scene;
    (b) capturing a background reference image comprising a plurality of background reference pixels representing said background of said scene;
    (c) classifying an input pixel as one a pixel of said background and said foreground according to a relationship of said input pixel to a background reference pixel;
    (d) identifying a structure in said input image; and
    (e) revising said classification of said input pixel according to a membership of said input pixel in said structure.

2. The method claim 1 wherein the step of classifying an input pixel as one of a background and a foreground pixel according to a relationship of said input pixel to a background reference pixel comprises the steps of:
    (a) determining a first probability that said input pixel is a pixel of one of said background and said foreground if a relationship of said input pixel and said background reference pixel at least equals a threshold; and
    (b) determining a second probability that said input pixel is a pixel of one of said background and said foreground if said relationship of said input pixel and said background reference pixel does not at least equal to said threshold.

3. The method of claim 2 wherein at least one of said first and said second probabilities is a function of a difference between said input pixel and said background reference pixel.

4. The method of claim 3 wherein said difference between said input pixel and said background reference pixel comprises a difference between a chromatic value of said input pixel and a chromatic value of said background reference pixel.

5. The method of claim 4 wherein at least one of said chromatic values of said input pixel and said background reference pixel comprises a sum of a plurality of chromatic components of said pixel.

6. The method of claim 2 wherein said relationship of said input pixel and said background reference pixel comprises a difference between a chromatic value of said input pixel and a chromatic value of said background reference pixel.

7. The method of claim 6 wherein at least of one said chromatic values of said input pixel and said background reference pixel comprises a sum of a plurality of chromatic components of said pixel.

8. The method of claim 6 wherein said chromatic value of said background reference pixel comprises a mean of a plurality of chromatic values for a plurality of background pixels included in a plurality of images.

9. The method of claim 2 wherein said function of said chromatic value of said background reference pixel comprises a function of a standard deviation of a chromatic value of a plurality of background pixels included in a plurality of images.

10. The method of claim 1 wherein the step of identifying a structure in said image comprises the step of filtering said image with a morphological filter to identify a plurality of connected input pixels in said image.

11. The method of claim 1 wherein the step of revising said classification of said input pixel according to a membership of said input pixel in said structure comprises the steps of:
    (a) revising one of said first and said second probabilities according to a first relationship if said input pixel is a pixel included in said structure; and
    (b) revising one of said first and said second probabilities according to a second relationship if said input pixel is not a pixel included in said structure.

12. The method of claim 11 wherein at least one of said first and said second relationships comprises a probability that a pixel neighboring said input pixel is a pixel of one of said background and said foreground.

13. The method of claim 11 wherein said first relationship comprises a minimum probability that one of a plurality of pixels neighboring said input pixel is a background pixel.

14. The method of claim 11 wherein said second relationship comprises a maximum probability that one of a plurality of pixels neighboring said input pixel is a background pixel.

15. The method of claim 1 further comprising the step of revising a background reference pixel according to a relationship of said background reference pixel and an input pixel.

16. The method of claim 15 wherein the step of revising said background reference pixel according to a relationship of said background reference pixel and an input pixel comprises the step of determining a mean of a chromatic value of said background reference pixel and a chromatic value of said input pixel if said input pixel is classified as a pixel of said background.

17. The method of claim 15 wherein said relationship for said chromatic value of said background reference pixel comprises a function of a standard deviation of a chromatic value for a plurality of background pixels included in a plurality of images.

18. A method of segmenting an image comprising the steps of:
  (a) capturing said image comprising a plurality of input pixels representing a background and a foreground of a scene;
  (b) capturing a background reference image comprising a plurality of background reference pixels representing a background of said scene;
  (c) determining a probability that an input pixel is a pixel of one of said background and said foreground according to a relationship of a value measuring said input pixel and a value measuring a background reference pixel;
  (d) identifying a pixel structure in said image;
  (f) revising said probability for said input pixel according to a membership of said input pixel in said pixel structure and a probability that a neighboring pixel is a pixel of one of said background and said foreground; and
  (g) revising said value measuring said a background reference pixel according to a relationship of said background reference pixel and said input pixel.

19. The method claim 18 wherein the step of determining a probability that an input pixel is a pixel of one said background and said foreground according to a relationship of a value measuring said input pixel and a value measuring a background reference pixel comprises the steps of:
  (a) determining a first probability that said input pixel is a pixel of one of said background and said foreground if a relationship of said values measuring said input pixel and said background reference pixel at least equals a threshold; and
  (b) determining a second probability that said input pixel is a pixel of one of said background and said foreground if said relationship of said values measuring said input pixel and said background reference pixel does not at least equal to said threshold.

20. The method of claim 19 wherein at least one of said first and said second probabilities is a function of a difference between said values measuring said input pixel and said background reference pixel.

21. The method of claim 20 wherein said difference between said values measuring said input pixel and said background reference pixel comprises a difference between a chromatic value of said input pixel and a chromatic value of said background reference pixel.

22. The method of claim 21 wherein at least of one said chromatic values of said input pixel and said background reference pixel comprises a sum of a plurality of chromatic components for said pixel.

23. The method of claim 19 wherein said relationship of said values measuring said input pixel and said background reference pixel comprises a difference between a chromatic value of said input pixel and a chromatic value of said background reference pixel.

24. The method of claim 23 wherein at least one said chromatic values of said input pixel and said background reference pixel comprises a sum of a plurality of chromatic components for said pixel.

25. The method of claim 23 wherein said chromatic value of said background reference pixel comprises a mean of a chromatic value for a plurality of background pixels included in a plurality of images.

26. The method of claim 19 wherein said threshold comprises a relationship for a chromatic value for said background reference pixel.

27. The method of claim 18 wherein the step of identifying a pixel structure in said image comprises the step of filtering said image with a morphological filter to identify a plurality of connected input pixels in said image.

28. The method of claim 18 wherein the step of revising said probability for said input pixel according to a membership of said input pixel in said pixel structure and a probability that a neighboring pixel is a pixel of one of said background and said foreground comprises the steps of:
  (a) assigning a first probability value to said input pixel if said input pixel is a pixel included in said structure; and
  (b) assigning a second probability value to said input pixel if said input pixel is not a pixel included in said structure.

29. The method of claim 28 wherein at least one of said first and said second probability values comprises a probability that one of a plurality of neighboring pixels is a pixel of one of said foreground and said background.

30. The method of claim 28 wherein at least one of said first and said second probability values comprises one of a minimum and a maximum probability that one of a plurality of neighboring pixels a pixel of one of said foreground and said background.

31. The method of claim 18 wherein the step of revising said value measuring said a background reference pixel according to a relationship of said background reference pixel and said input pixel comprises the step of determining a mean of said value measuring said background reference pixel and said value measuring said input pixel if said input pixel is a pixel of said background.

32. The method of claim 31 wherein at least one of said values measuring said input pixel and said background reference pixel comprises a chromatic value for said pixel.

33. The method of claim 32 wherein at least one said chromatic value of said input pixel and said background reference pixel comprises a sum of a plurality of chromatic components for said pixel.

* * * * *